United States Patent

Gabas

Patent Number: 5,564,314
Date of Patent: Oct. 15, 1996

[54] CONTROL CABLE LENGTH SELF-ADJUSTING DEVICE

[75] Inventor: Carlos Gabas, Barcelona, Spain

[73] Assignee: Fico Cables S.A., Rubi, Spain

[21] Appl. No.: 244,581

[22] PCT Filed: Nov. 10, 1993

[86] PCT No.: PCT/ES93/00084

§ 371 Date: May 27, 1994

§ 102(e) Date: May 27, 1994

[87] PCT Pub. No.: WO94/10467

PCT Pub. Date: May 11, 1994

[30] Foreign Application Priority Data

Oct. 26, 1992 [ES] Spain .................. 9202141

[51] Int. Cl.[6] .................................. F16C 1/10
[52] U.S. Cl. .................. 74/501.5 R; 74/500.5; 74/502.4; 74/502.6
[58] Field of Search ................. 74/500.5, 501.5 R, 74/502, 502.4, 502.6; 403/197; 192/111 A; 188/196 B

[56] References Cited

U.S. PATENT DOCUMENTS

| | | | |
|---|---|---|---|
| 3,988,943 | 11/1976 | Orcutt | 74/502.4 |
| 5,003,837 | 4/1991 | Italiano | 74/502 X |
| 5,015,023 | 5/1991 | Hall | 74/502.4 |
| 5,086,662 | 2/1992 | Tayon et al. | 74/5 |
| 5,144,856 | 9/1992 | Roca | 74/502.4 |
| 5,156,063 | 10/1992 | Kelley | 74/501.5 R |
| 5,220,832 | 6/1993 | Petruccello | 74/500.5 X |
| 5,293,785 | 3/1994 | Lichtenberg | 74/502.4 |
| 5,383,377 | 1/1995 | Boike | 74/502 |

FOREIGN PATENT DOCUMENTS

| | | | |
|---|---|---|---|
| 0055649 | 7/1982 | European Pat. Off. | 74/501.5 R |
| 0365242 | 4/1990 | European Pat. Off. | 74/501.5 R |
| 2686663 | 7/1993 | France | 74/502.4 |
| 9001269 | 7/1990 | Spain | 74/501.5 R |
| 708092 | 4/1954 | United Kingdom | 74/502.6 |
| 2081411 | 2/1982 | United Kingdom | 74/502.4 |

Primary Examiner—Vinh T. Luong
Attorney, Agent, or Firm—Michael J. Striker

[57] ABSTRACT

A control cable length self-adjusting device comprises a regulating rod having one end attachable to a corresponding end of a sheath of a sheathed cable portion and also an axial through passage through which a steel cable having no sheath is slidable, a base body provided with retaining element acting on the regulating rod being substantially cylindrical and having element for firm attachment of the base body to a fixed point of a vehicle structure, the base body formed as a substantially hollow cylindrical one-piece member composed of a plastic material and having one end provided with a cover with an axial through passage for sliding a steel cable having no sheath and another end which is open and provided with the retaining element acting on the regulating rod, the base body being dimensioned so that the regulating rod is snugly slidable in an interior of the base body.

6 Claims, 2 Drawing Sheets

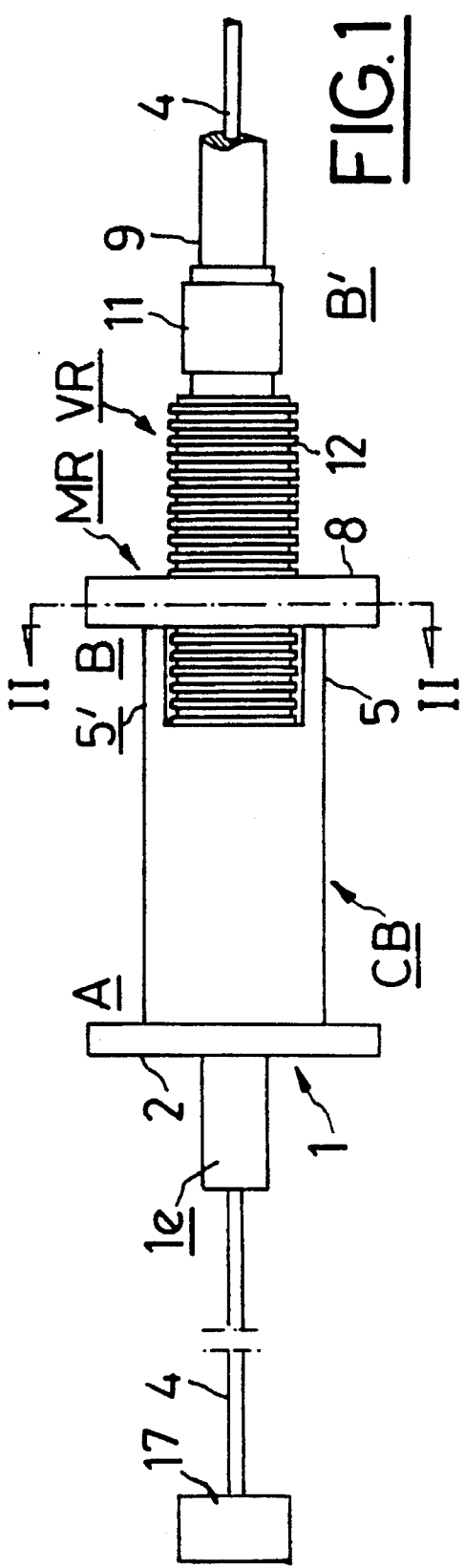
FIG. 1
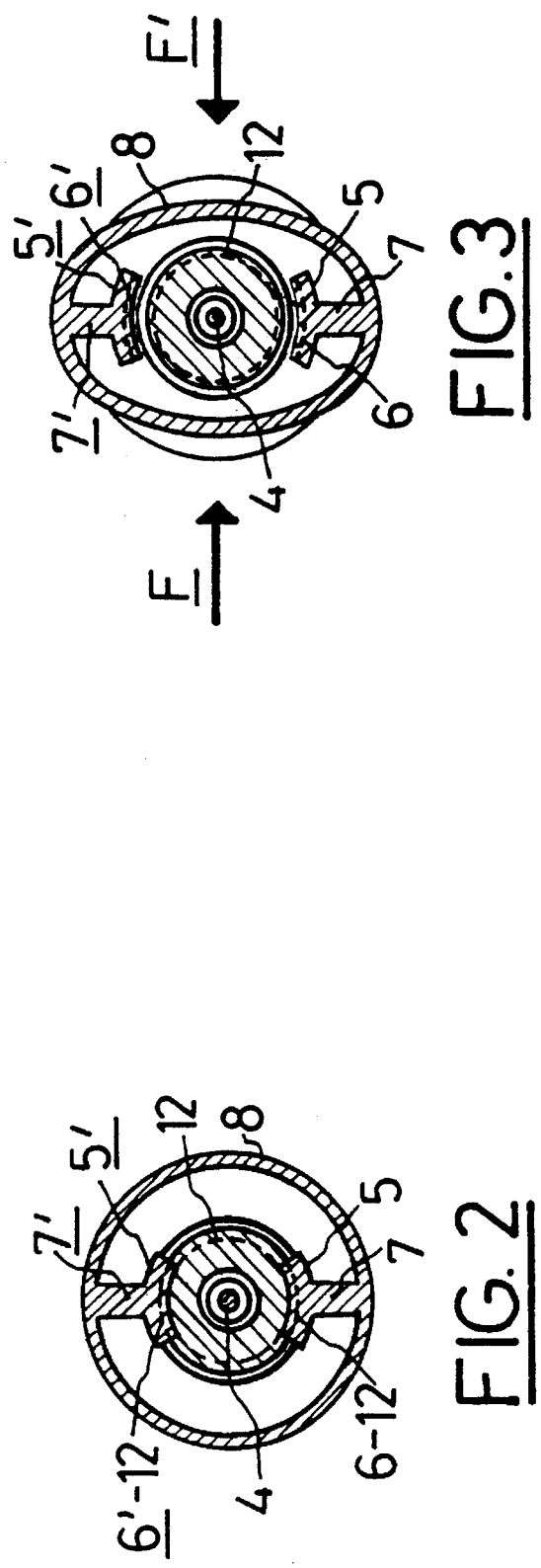
FIG. 2
FIG. 3

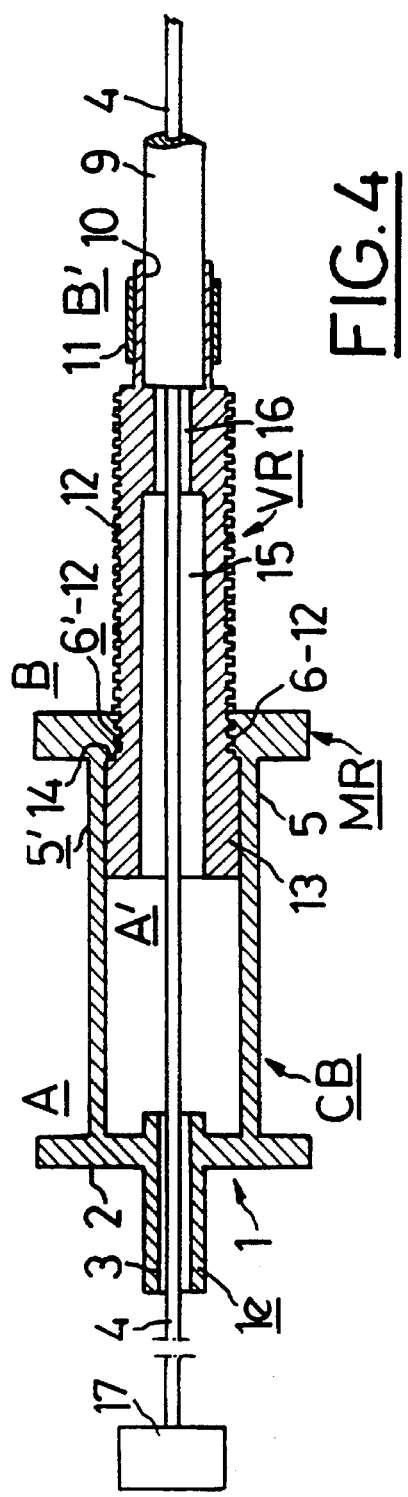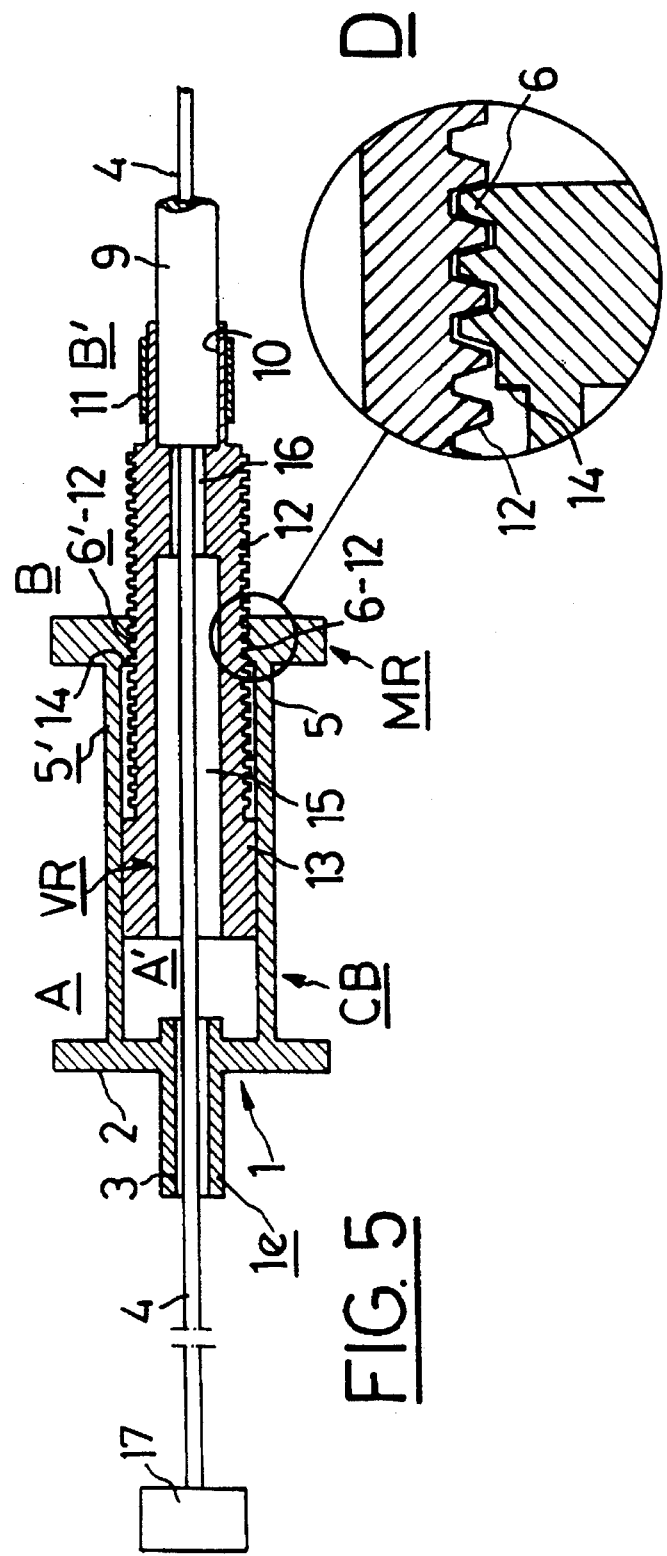

CONTROL CABLE LENGTH SELF-ADJUSTING DEVICE

BACKGROUND OF THE INVENTION

The present invention relates to a control cable length self-adjusting device which is applicable, in particular, to the adjustment of the length of sheathed control cables used, in general, in industry and in the automobile industry in particular.

As is well known, said control cables are formed, basically, by a steel cable having a sleeve or sheath appropriate for the anticipated service conditions. They are used as a linking member between control means and devices of any nature. In automobiles, the control cables are used, among other cases and just as one example of application, as a linking member between the accelerator pedal and the corresponding engine carburetor mechanism. The control cables, further to the sheathed steel cable as such, regularly comprise at the ends thereof respective connection terminals, the shape of which depends on the needs of each particular application and, suitably arranged relative to one of the ends of the sheathed steel cable portion, a self-adjusting device for the length of said sheathed cable portion.

The purpose of the self-adjusting device is to compensate, for each vehicle in particular, the tolerance required by the sheathed cable portion of the control cable, with regard to the length thereof, to achieve an adequate transmission of the forces and movements. The sheathed cable portion length is adjusted, as described hereinafter, after the control cable has been suitably attached at both ends to the control means (which may be a lever, a pedal or a control arm) and to the controlled device (which may be an automobile carburetor, a lock or any other remote controlled mechanism), respectively, and after the self-adjusting device has been anchored to a fixed point on the vehicle structure.

Generally speaking, the known self-adjusting devices comprise a base body having means for the anchorage thereof to the vehicle structure, a regulating rod firmly attached at one of the ends thereof to the corresponding end of the control cable sheath and through which the steel cable may slide an adjusting spring which initially is supplied compressed to a pre-set value; and manually operated regulating rod retaining means.

The length of the sheathed cable portion is adjusted, in general, by the self-adjusting devices. With the control cable mounted in the vehicle and the control means and controlled device in the pre-set service conditions, the regulating rod is first freed by hand from the self-adjusting device retaining means; therefore the rod, urged by the regulating spring, moves to an adjusted position in which the resilient reaction of the sheathed cable portion when placed under compression balances the reaction of the regulating spring, at which time the sheathed cable portion length is adjusted. Secondly, while retaining the pre-set service conditions of the control means and controlled device, the adjusted position attained by the regulating rod is set, also by hand, by operating once again the self-adjusting device retaining means.

As an example of known self-adjusting devices, there may be cited the device disclosed in Spanish patent P 9001269 comprising the members described above, further to those which characterize it. The device according to Spanish patent P 9001269 has manual retaining means operating means formed by a shaft having a transverse extension allowing the user to perform the release and/or retaining operations for the regulating rod during the sheathed cable portion length adjusting operations.

The known self-adjusting devices, such as those described in the foregoing paragraphs, suffer in general from the drawback of being formed by a large number of components, making the production costs thereof higher. Another drawback of such known embodiments is that, to adjust the sheathed cable portion length, the user must manually operate the retaining means acting on the regulating rod to release it and/or retain it, which makes the assembly costs of the self-adjusting device in the vehicle more expensive.

SUMMARY OF THE INVENTION

With a view to providing a solution to the above described problems of the known embodiments of self-adjusting devices, there is disclosed a new self-adjusting device for the length of control cables which is of particular application in control cables the route of which between the control means and the self-adjusting device itself is very sinuous, i.e. has a relatively large number of changes of direction and curved portions.

The self-adjusting device of the present invention comprises a base body and a regulating rod. The base body is provided with retaining means acting on the regulating rod and means for the firm attachment thereof to the vehicle structure. The regulating rod is essentially cylindrical and is firmly attached at one end thereof to the corresponding end of the sheath of the sheathed cable portion. The rod has an axial through passage through which the sheath-free steel cable may slide and is provided externally with a retaining screw thread. The base body and regulating rod is well known and form part wholly or partially of the known self-adjusting devices for control cables.

The device of the invention is characterized in that the base body, which is made from plastics material of appropriate mechanical strength and resilience, is a one-piece member and is essentially an elongate hollow cylinder which, at one end thereof, is provided with a cover having an axial through passage through which the sheath-free steel cable may slide and, at the other end thereof, which is open, is provided with the retaining means acting permanently on the regulating rod. The base body is so dimensioned that the regulating rod may snugly be slid in the interior thereof.

A further feature of the device of the invention is that the retaining means on the base body comprises two mutually symmetrical diametrally opposed longitudinal extensions which are provided internally at the respective ends thereof with a retaining screw thread which is so dimensioned as to mate with the regulating rod retaining screw thread and externally with an orthogonal extension, the respective ends of the two orthogonal extensions being connected together with a circular lock ring coaxial with the base body.

A further feature of the device of the invention is that the retaining screw threads of the two longitudinal extensions of the retaining means of the base body and regulating rod, respectively, have a trapezial cross section.

Yet a further feature of the device of the invention is that at the open end of the base body and at the inner end of the regulating rod, which is the end opposite to the one to which the steel cable sheath is firmly attached, there are respective annular positioning shoulders which set the maximum portion of rod which may project beyond the base body.

The self-adjusting device operates as follows.

Initially, it is supplied, with the regulating rod extending out from the open end of the base body to the fullest possible extent. Under these conditions, the action of the two screw threads of the retaining means on the regulating rod screw thread prevent the rod from being accidentally inserted inside the base body, due to the handling of the device prior to assembly in the automobile.

Once the self-adjusting device of the invention has been firmly attached to a fixed point of the vehicle structure, by way of the means provided on the base body, and after both control cable connection terminals have been fixed to the control means and to the corresponding device, respectively, the initial operation of the control means will cause a longitudinal pull on the sleeved cable portion, which pull will thrust the regulating rod into the base body to the extent required by each particular application. As from that initial operation, the regulating rod will be positionally held in place by the mutual action of the retaining screw threads of said rod and base body retaining means. In this way, the length of the sheathed cable portion of the control cable will be automatically adjusted during said initial operation, without the user having to manipulate the retaining means of the device of the invention, as happens with the known embodiments of self-adjusting devices.

During such initial operation of the control means, the regulating rod may be inserted inside the base body provided that the pull on the control cable, or thrust, is greater than the resilient deformation reaction simultaneously offered by the two longitudinal extensions and the lock ring of the retaining means of the base body. In the as supplied state of the device of the invention, the threads of the longitudinal extensions and of the rod are engaged without either exerting any pressure on the other. The resilient deformation reaction of said extensions and of the circular ring is caused by the action of the rod screw thread on the screw threads of said extensions. In fact, the thrust transmitted to the rod by the cable sheath causes the sloping sides of the rod screw threads facing the base body to press against the corresponding sloping sides of the screw threads of said two extensions such as, if such pressure is sufficiently high, to cause the sliding of the rod screw thread over the screw threads of the longitudinal extensions in view of the consequent resilient deformation of the latter and of the circular ring, and the rod will be inserted in the base body. The rod will continue being inserted in the base body until the pull, or thrust of the control cable sheath is insufficient to cause the necessary resilient deformation of the extensions and circular ring, at which time the joint action of the retaining threads of said extensions and of the rod will set the position occupied by the rod relative to the base body and, consequently, the sheathed cable portion of the control cable will be adjusted.

When the control cable had to be removed for vehicle repair and/or maintenance needs, the user only has to press on the circular lock ring of the device retaining means so as to release the rod screw thread from the screw threads of the two longitudinal extensions of the base body and manually remove said rod from the base body to the extent corresponding to the original or delivery position of the self-adjusting device. In this way, the control cable is placed in the original supply position and from here the control cable may be removed from the its place in the vehicle. Once the repair or maintenance operations have been completed, the control cable, and the self-adjusting device of the invention, may be reassembled in the vehicle, where the sheathed cable portion length will be adjusted as described above.

Thus, the features of the self-adjusting device of the invention provide a new solution to the above described drawbacks affecting the known control cable length self-adjusting devices. In fact, the structural simplicity of the device of the invention and, in particular, the small number of component parts, reduce the production costs thereof in comparison with the known embodiments and, furthermore, when adjusting the sheathed cable portion length, the user does not have to manipulate the self-adjusting device, which reduces the costs derived from the assembly of the device in the vehicle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a side view of the self-adjusting device of the invention.

FIG. 2 is a cross section view on the line II—II of FIG. 1.

FIG. 3 is a cross section view of the self-adjusting device of the invention, showing the release of the regulating rod by resilient deformation of the circular lock ring of the retaining means.

FIG. 4 is a longitudinal view, partly in section of the self-adjusting device of the invention, as originally supplied.

FIG. 5 is a longitudinal view, partly in section of the self-adjusting device of the invention, with the regulating rod occupying an intermediate position.

DESCRIPTION OF A PREFERRED EMBODIMENT

The control cable length self-adjusting device of the invention, described as an example, comprises the base body CB and the regulating rod VR, as shown in FIGS. 4 and 5 of the drawing sheets.

The base body CB, as shown in the drawing figures, is a one-piece essentially cylindrical elongate hollow member. One end, marked A, of the base body CB is provided with a cover 1 extended outwardly and longitudinally with the cylindrical extension 1e and the other end, marked B, has retaining means MR acting on the regulating rod VR.

In this embodiment of the base body CB, the means thereof for attachment to a fixed point of the automobile structure comprises the annular thickened portion 2. Obviously, the annular thickening 2 is given only as a guidance, since the means for attachment of the base body CB and consequently of the device of the invention, may have any other configuration appropriate for each particular case of application, without this affecting the essence of the invention.

FIGS. 4 and 5 show how the cover 1 and the cylindrical extension 1e thereof are provided with the through passage 3 dimensioned so that the steel cable 4 may slide therein.

The base body CB is formed, at the open end B thereof, as said above, the retaining means MR comprising, as shown in FIGS. 1 and 2, two longitudinal extensions 5 and 5' diametrally opposite to each other and having the same length. FIGS. 2 to 5 show how said extensions 5 and 5' are provided, internally at the ends thereof, with the retaining screw threads 6 and 6', respectively, as shown in the enlarged detail D of FIG. 5, the screw threads having a trapezoidal cross section. The ends of the two extensions 5 and 5' are provided, as shown in FIGS. 2 and 3, with respective orthogonal extensions 7 and 7' which extend diametrally over the same length and the respective ends of which are connected, transversely relative to the base body CB, with the circular lock ring 8.

The two longitudinal extensions 5 and 5' and the orthogonal extensions 7 and 7' and the circular lock ring 8 of the base body CB are so dimensioned that when the lock ring 8 is squeezed transversely as at F and F' in FIG. 3, said lock ring 8 resiliently adopts an oblong configuration which, by means of the orthogonal extensions 7 and 7', causes the longitudinal extensions 5 and 5' to diverge, increasing the distance between the retaining screw threads 6 and 6' respectively provided thereon.

The drawing figures show how the regulating rod VR is essentially cylindrical and is attached, at the rear end marked B' to the corresponding end of the sheath 9 of the steel cable 4, as shown in FIGS. 1, 4 and 5. In this embodiment of the adjusting rod VR, the attachment is effected by the through passage 10, in which there is housed said end of the sheath 9, and by the clamp 11 ensuring the tightness of the connection, as shown in FIGS. 4 and 5.

The regulating rod VR is provided on the outside thereof with the retaining screw thread 12 which is dimensioned in correspondence with the retaining screw threads 6 and 6' of the longitudinal extensions 5 and 5' of the retaining means MR. The enlarged detail D of FIG. 5 shows how the retaining screw thread 12 has a trapezoidal cross section corresponding to that of said screw threads 6 and 6'.

FIGS. 4 and 5 show how the front end A' of the regulating rod VR and the open end B of the base body CB are provided with respective annular shoulders 13 and 14 acting as stops to set the maximum portion of the regulating rod VR which, as shown in FIG. 4, may project out from the base body CB.

FIGS. 4 and 5 show how the regulating rod VR has the axial cavity 15 opening out into the front end A' thereof and which is connected internally with the axial passage 10 housing the end of the sheath 9 by means of the axial passage 16 of smaller cross section. Said axial cavity 15, which is essentially cylindrical, is provided for constructional requirements of this embodiment of the regulating rod VR and does not affect the essence of the invention.

The operation of the control cable length self-adjusting device of the invention will be described below.

As an example, the device is applied to adjusting the length of the portion of sheathed cable of the control cable which normally connects the accelerator pedal with the corresponding carburetor mechanism of an automobile, which cable, for any reason whatsoever, follows a highly sinuous path. In this respect, neither said pedal and mechanism nor their respective conventions with the control cable have been shown in the drawing figures. This is why, hereinafter with regard to FIGS. 4 and 5, the connexion terminal 17, attached to one end of the cable 4, is deemed to be attached to the said carburetor mechanism and the other end of the sheathed steel cable 4–9, which has not been shown in the drawings, is attached to the accelerator pedal. Under these premises, the device of the invention operates as follows:

The device is supplied originally as shown in FIG. 4. Under these conditions, the regulating rod VR extends as far as possible from the base body CB and the action of the screw threads 6–6' of the extensions 5–5', respectively, of the base body CB on the screw thread 12 of the regulating rod VR prevents this being accidentally inserted in the base body CB while being handled prior to its assembly in the automobile;

As explained above, the device of the invention is mounted in the vehicle so that the terminal 17 is attached to the carburetor mechanism, the base body CB is attached by way of the annular thickened portion 2 to a fixed point of the vehicle structure and the other end of the sheathed cable 4–9, which as said before has not been shown in the drawing sheet figures, is attached to the accelerator pedal;

Once the control cable has been installed as described in the foregoing paragraph, the length of the portion of sheathed cable 4–9 is adjusted simply by pressing on the accelerator pedal down as far as it will go. In fact, this action on the pedal mechanically pulls the sheathed cable portion 4–9 so as to move the regulating rod VR inside the base body CB, overcoming the resilient reaction opposition of the longitudinal extensions 5–5' and of the circular lock ring 8 of the base body CB. This movement is continued until the mechanical pull and the resilient reaction are balanced, at which time the length of the sheathed cable portion 4–9 is adjusted, as shown in FIG. 5;

On releasing the pressure on the accelerator pedal, the joint action of the retaining screw threads 6–6' and 12 of the retaining means MR of the base body CB and of the regulating rod VR respectively, set the position attained by the retaining rod VR in the interior of the base body CB, so that, during the normal operation of the device of the invention, the rod VR may not move from said position attained.

From the operation of the device of the invention described above, it will be understood that at no time is it necessary for the user to manipulate the retaining means MR of said device during the operation of adjusting the length of the sheathed cable portion of the control cable, unlike the known embodiments of self-adjusting devices in which such manipulation is absolutely necessary.

When the control cable has to be removed as a result of vehicle maintenance and/or repair operations, the user only has to squeeze the circular lock ring 8 of the base body CB so that, as shown in FIG. 3, the resilient deformation of the two longitudinal extensions 5 and 5' releases the regulating rod VR by disengagement of the respective retaining screw threads 6–6' and 12 thereof. Once the regulating rod VR is released, the user manually pulls the regulating rod VR out of its housing in the base body CB, up to the initial or supply position illustrated in FIG. 4 position, at which time the control cable may be removed from its location in the vehicle.

Once the above maintenance and/or repair operations have been completed, the control cable and, consequently, the self-adjusting device of the invention, may be remounted in the automobile and the length of the sheathed cable portion 4–9 may be adjusted as described above.

It will be understood that each of the elements described above, or two or more together, may also find a useful application in other types of constructions differing from the types described above.

While the invention has been illustrated and described as embodied in a control cable length self-adjusting device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A control cable length self-adjusting device, comprising a regulating rod having one end attached to a corresponding end of a sheath of a portion of a cable and also an axial through passage through which the cable without the sheath slides; a base body provided with retaining means acting on said regulating rod and means adapted for firm attachment of said base body to a fixed point of a vehicle structure; said base body formed as a hollow one-piece member and having one end provided with a cover with said axial through passage for sliding the cable without the sheath and another end which is open and provided with said retaining means acting on said regulating rod, said base body being dimensioned so that said regulating rod snugly slides in an interior of said base body, said regulating rod being provided with an external retaining screw thread, said retaining means on said base body including two mutually symmetrical diametrically opposite longitudianl extensions which are provided internally at their ends with a retaining screw thread dimensioned so as to match said retaining screw thread of said regulating rod; and means for setting a maximum portion of said regulating road which projects beyond said base body, said setting means including annular positioning shoulders provided at said other end of said base body which is open and at an inner end of said regulating rod which inner end is opposite to said one end to which the sheath of the cable is attached, said annular positioning shoulders extending longitudinally uninterrupedly to said base body and of said regulating rod and projecting from said body and said regulating rod transversely so as to engage one another and set the maximum portion of said regulating rod which longitudinally projects beyond said base body.

2. A control cable length self-adjusting device as defined in claim 1, wherein said regulating rod is provided with an external retaining screw thread.

3. A control cable length self-adjusting device as defined in claim 2, wherein said retaining means on said base body include two mutually symmetrical diametrically opposite longitudinal extensions which are provided internally at their ends with internal retaining screw threads dimensioned so as to match said external retaining screw thread of said regulating rod.

4. A control cable length self-adjusting device as defined in claim 3, wherein said internal retaining screw threads of said two longitudinal extensions of said retaining means of said base body and said external retaining threads of said regulating rod have a trapezoidal cross-section.

5. A control cable length self-adjusting device, comprising a regulating rod having one end attached to a corresponding end of a sheath of a portion of a cable and also an axial through passage through which the cable without the sheath slides; a base body provided with retaining means acting on said regulating rod and means adapted for firm attachment of said base body to a fixed point of a vehicle structure; said base body formed as a hollow one-piece member and having one end provided with a cover with said axial through passage for sliding the cable without the sheath and another end which is open and provided with said retaining means acting on said regulating rod, said base body being dimensioned so that said regulating rod snugly slides in an interior of said base body; and a circular lock ring coaxial with said base body, said longitudinal extension being provided externally with an orthogonal extension having ends connected together with said circular lock ring.

6. A control cable length self-adjusting device, comprising a regulating rod having one end attached to a corresponding end of a sheath of a portion of a cable and also an axial through passage through which the cable without the sheath slides; a base body provided with retaining means acting on said regulating rod and means adapted for firm attachment of said base body to a fixed point of a vehicle structure; said base body formed as a hollow one-piece member and having one end provided with a cover with said axial through passage for sliding the cable without the sheath and another end which is open and provided with said retaining means acting on said regulating rod, said base body being dimensioned so that said regulating rod snugly slides in an interior of said base body, said regulating rod being provided with an external retaining screw thread, said retaining means on said base body including two mutually symmetrical diametrically opposite longitudinal extensions which are provided internally at their ends with a retaining screw thread dimensioned so as to match said retaining screw thread of said regulating rod; and a circular lock ring coaxial with said base body, said longitudinal extension being provided externally with an orthogonal extension having ends connected together with said circular lock ring.

\* \* \* \* \*